(12) United States Patent
Vasekin

(10) Patent No.: US 7,386,709 B2
(45) Date of Patent: Jun. 10, 2008

(54) CONTROLLING EXECUTION OF A BLOCK OF PROGRAM INSTRUCTIONS WITHIN A COMPUTER PROCESSING SYSTEM

(75) Inventor: Vladimir Vasekin, Cambridge (GB)

(73) Assignee: ARM Limited, Cambridge (GB)

( * ) Notice: Subject to any disclaimer, the term of this patent is extended or adjusted under 35 U.S.C. 154(b) by 260 days.

(21) Appl. No.: 10/755,449

(22) Filed: Jan. 13, 2004

(65) Prior Publication Data

US 2004/0199754 A1    Oct. 7, 2004

(30) Foreign Application Priority Data

Apr. 4, 2003    (GB)    ................. 0307821.9

(51) Int. Cl.
*G06F 9/40*    (2006.01)

(52) U.S. Cl. ........................................ 712/242

(58) Field of Classification Search .............. 712/242
See application file for complete search history.

(56) References Cited

U.S. PATENT DOCUMENTS

| | | | |
|---|---|---|---|
| 2,419,114 A | 4/1947 | Briegel | |
| 4,098,278 A | 7/1978 | Schwartz | |
| 4,690,139 A | 9/1987 | Rosenberg | |
| 5,117,498 A | 5/1992 | Miller et al. | |
| 5,768,576 A | 6/1998 | Hoyt et al. | |
| 6,170,998 B1 | 1/2001 | Yamamoto et al. | |
| 6,304,962 B1 | 10/2001 | Nair | |
| 6,440,143 B2 | 8/2002 | Kasten | |
| 6,851,046 B1 * | 2/2005 | Delvaux et al. | ............ 712/236 |
| 6,907,598 B2 * | 6/2005 | Fraser | ......................... 717/127 |

FOREIGN PATENT DOCUMENTS

| | | |
|---|---|---|
| EP | 0 742 513 | 11/1996 |
| FR | 1.009.467 | 5/1952 |
| GB | 1.048.353 | 11/1966 |
| WO | WO 87/03394 | 6/1987 |

OTHER PUBLICATIONS

"An Instruction for Direct Interpretation of LZ77-compressed Programs"; Christopher W. Fraser; Sep. 2002.*
"Computer Architecture: A Quantitive Approach"; Third Edition; Hennessy et al.; Morgan Kaufmann; May 2002.*

* cited by examiner

*Primary Examiner*—Alford Kindred
*Assistant Examiner*—Benjamin P. Geib
(74) *Attorney, Agent, or Firm*—Nixon & Vanderhye P.C.

(57) ABSTRACT

A data processing apparatus is provided with an execute block instruction EMB which specifies a memory location of a block of program instructions to be executed as well as the length of that block of program instructions. When the end of that block of program instructions has been reached as tracked in response to the specified length value, a return to the main program flow is triggered. The instruction decoder can include a block counter register to keep track of the position within the block of program instructions being called. The block of program instructions are fetched by a prefetch unit into the instruction pipeline following the execute block instruction and are treated as having a program counter value corresponding to the execute block instruction whilst the block counter value keeps track of their separate positions within the block of program instructions.

18 Claims, 3 Drawing Sheets

CONTROLLING EXECUTION OF A BLOCK OF PROGRAM INSTRUCTIONS WITHIN A COMPUTER PROCESSING SYSTEM

BACKGROUND OF THE INVENTION

This application claims priority to UK Application No. 0307821.9, filed 04 Apr. 2003. The entire contents of this application are incorporated herein by reference.

1. Field of the Invention

This invention relates to the field of data processing systems. More particularly, this invention relates to the control of execution of a block of program instructions within a data processing system.

2. Description of the Prior Art

It is known that computer programs often contain sequences of program instructions that are frequently repeated within the computer program. In order to produce a computer program with a smaller code size, it is known to arrange such blocks of computer program instructions into functions or subroutines which can be called from various positions within the computer program.

It is normal for such subroutines to terminate with a return instruction which commands the data processing apparatus to return to the instruction immediately following the point in the computer program from where the call to the subroutine was made. When the subroutine or block of instructions is short in length, then the overhead of providing a return instruction at the end of the subroutine can form a significant proportion of the size of the subroutine itself. As an example, if the subroutine block of program instructions being called is only three instructions in length, then the necessary return instruction at the end of the block increases this length to four instructions and results in a significant increase in code size when this is repeated across a large number of such subroutines which may be included within a computer program as a whole.

It is also known to provide data processing systems including a dictionary function whereby an instruction in the program is a dictionary instruction which triggers a reference to be made to a stored dictionary table where there is a pointer to a memory location storing a sequence of program instructions to be executed in response to that dictionary function. The dictionary table may also include an indication of the length of that block of instructions. The dictionary table approach has the disadvantage that an additional memory construct, namely the dictionary table, needs to be provided within the data processing system as well as additional registers for keeping track of full length memory addresses for the dictionary instruction and the position within the block of program instructions called. In the context of blocks of program instructions which are very short in length, the storage requirements of the dictionary table entries relating to those small blocks of program instructions form a significant proportion of the storage requirements for those blocks of instructions in a manner which is disadvantageous.

A further disadvantage of the dictionary table approach is that it is a more radical change to an existing data processing system architecture if it is to be added to such an existing data processing system architecture. It is desirable that new functionality should be added to a data processing system architecture in a manner which minimises the degree of architectural change necessary.

It is also known within VAX architecture computers to provide an execute instruction which commands the system to execute an instruction found at a memory location specified by the execute instruction. This type of operation can be considered as a one-for-one replacement of the execute instruction within the program code by different instructions pointed to by those execute instructions. This type of functionality is particularly useful for debugging and diagnostic purposes but does not yield significant code density improvements.

SUMMARY OF THE INVENTION

Viewed from one aspect the present invention provides apparatus for processing data, said apparatus comprising:

an instruction fetching circuit operable to fetch program instructions from a sequence of memory locations;

an instruction decoder responsive to program instructions fetched by said instruction fetching circuit to control data processing operations specified by said program instructions; and an execution circuit operable under control of said instruction decoder to execute said data processing operations; wherein said instruction decoder is responsive to an execute block instruction to trigger fetching of a block of two or more program instructions by said instruction fetching circuit and execution of said block of two or more program instructions by said execution circuit, said block of two or more instructions containing a number of program instructions specified by a block length field within said executed block instruction and being stored at a memory location specified by a location field within said execute block instruction.

The present technique recognises that for a large number of blocks of program instructions that can advantageously be the subject of calls from different points within a program, the return instruction represents a significant overhead. Combined with this is the realisation that such small blocks of program instructions rarely need to include branch instructions such that when they are started they will with a high degree of probability always be run to their conclusion, i.e. result in a fixed number of program instructions being fetched and executed. Accordingly, the execute block instruction provided by the present technique specifies within the execute block instruction both the location of the block of program instructions to be executed as well as the length of that block of program instructions. Accordingly, there is no need for the block of program instructions to include a return instruction, since the length of the block is already known as specified within the execute block instruction and the return to the main program can be triggered when the final instruction within the block of program instructions has been executed. This execute block instruction extends the advantages of program instruction calls to small blocks of program instructions. The technique is also particularly well suited to use by program compilers which can identify frequently occurring small blocks of instructions within a program image and replace these by execute block instructions. The occurrence of a block in the normal code can be used as the target of branch instructions without the need to separately store the block of instructions elsewhere.

It will be appreciated that whilst it is possible that a block of program instructions being called could include a branch overriding the action of the execute block instruction and any return calculated from the length of the block specified in the execute block instruction, preferred embodiments to utilise the length of the block as specified in the execute block instruction to trigger a return to a program instruction outside of the block of program instructions once the execution of the block of program instructions has completed.

Whilst the return could be made to a variety of different program locations, such as specified in a final instruction of the block of program instructions, it is normal and advantageous that the return should be made by default to a program instruction immediately following the execute block instruction within the sequence of memory locations storing the main computer program.

The location field within the execute block instruction may specify the location of the block of program instructions in a variety of different ways, such as an absolute address value that advantageously uses an offset field as this is typically more space efficient and can be embedded within the size of bit field available within the execute block instruction.

Preferred embodiments of the invention use a program counter to store an address of a memory location of a program instruction being executed together with a block counter register storing a block count value indicative of a location of a program instruction being executed within a called block of program instructions. In this type of arrangement, when a call is made to a block of program instructions, the program counter register stores the memory location of the execute block instruction whilst the block counter register stores a block counter value indicative of the position within the block of program instructions that has been reached.

The use of a block count register and a program counter register in the above way is particularly useful during exception handling whereby an exception routine can be triggered and a return made after exception handling to the point within the block of instructions that was interrupted in dependence upon the program counter register referencing the execute block instruction and then reference to the block counter value to find the point reached within the block of program instructions.

Viewed from another aspect the present invention provides a method for processing data, said method comprising the steps of:

fetching program instructions from a sequence of memory locations with an instruction fetching circuit;

controlling data processing operations specified by said program instructions with an instruction decoder; and executing said data processing operations with an execution circuit controlled by said instruction decoder; wherein said instruction decoder is responsive to an execute block instruction to trigger fetching of a block of two or more program instructions by said instruction fetching circuit and execution of said block of two or more program instructions by said execution circuit, said block of two or more instructions containing a number of program instructions specified by a block length field within said executed block instruction and being stored at a memory location specified by a location field within said execute block instruction.

Viewed from a further aspect the present invention provides a computer program product including a computer program operable to control a data processing apparatus having an instruction fetching circuit operable to fetch program instructions from a sequence of memory locations, an instruction decoder responsive to program instructions fetched by said instruction fetching circuit to control data processing operations specified by said program instructions, and an execution circuit operable under control of said instruction decoder to execute said data processing operations; said computer program including one or more an execute block instructions operable to trigger fetching of a block of two or more program instructions by said instruction fetching circuit and execution of said block of two or more program instructions by said execution circuit, said block of two or more instructions containing a number of program instructions specified by a block length field within said executed block instruction and being stored at a memory location specified by a location field within said execute block instruction.

It will be appreciated that the computer program product could take a wide variety of different forms, such as a storage medium bearing the computer program or a download or transmission of a computer program. The computer program contains one or more executed block instructions of the type discussed above.

The above, and other objects, features and advantages of this invention will be apparent from the following detailed description of illustrative embodiments which is to be read in connection with the accompanying drawings.

DESCRIPTION OF THE PREFERRED EMBODIMENTS

Figure 1:
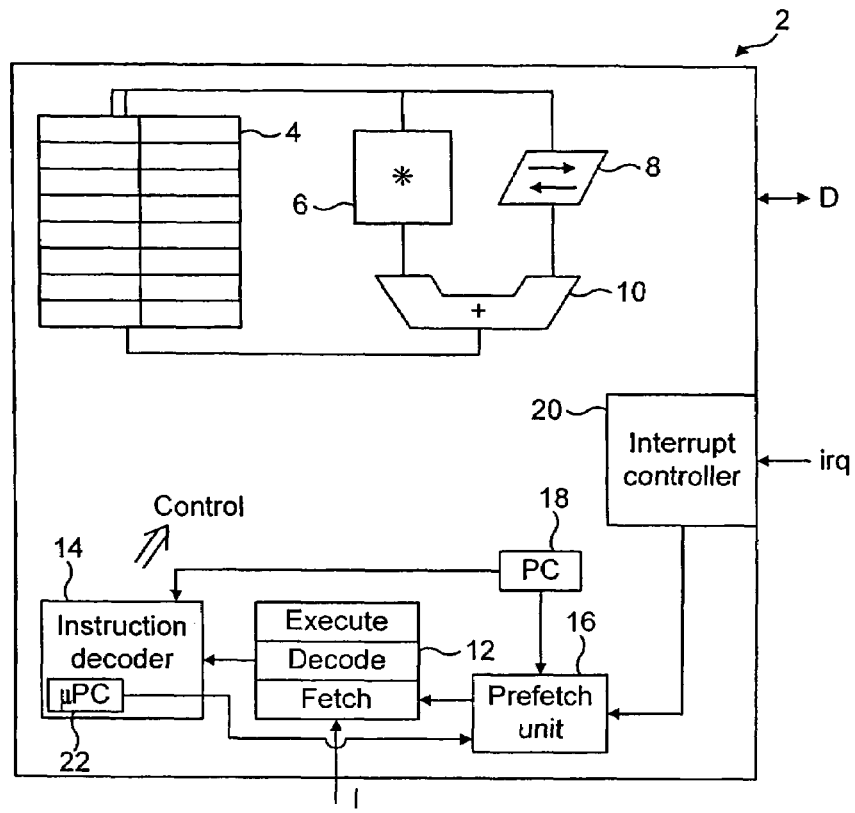
FIG. 1 schematically illustrates a data processing apparatus of a type suitable for executing execute block instructions.

FIG. 1 shows a data processing apparatus 2 including a register bank 4, a multiplier 6, a shifter 8, an adder 10, an instruction pipeline 12, an instruction decoder 14, a prefetch unit 16, a program counter register 18 and an interrupt controller 20. It will be appreciated that the data processing apparatus 2 as illustrated in FIG. 1 will typically include many further circuit elements, but these have been omitted for the sake of clarity. In operation, instructions are fetched from a memory under control of the prefetch unit 16 and a memory location as specified in the program counter register 18 into the fetch stage of the instruction pipeline 12. The instructions progress along the instruction pipeline 12 to a decode stage and then to an execute stage in accordance with normal microprocessing techniques. The instruction decoder 14 decodes the program instructions in the decode stage and generates control signals which are used to configure the circuit elements, such as the register bank 4, the multiplier 6, the shifter 8 and the adder 10, to perform specified data processing operations. The register bank 4, the multiplier 6, the shifter 8 and the adder 10 can be considered to be an execute circuit for executing processing operations as specified by program instructions and under control of the control signals generated by the instruction decoder 14. The interrupt controller 20 is responsive to interrupt signals irq to interrupt normal processing activity and trigger execution of an exception handling routine. The interrupt controller 20 forces the prefetch limit 16 to start fetching instructions from the start of the exception handling routine. Upon completion of the exception handling routine, the previous processing is resumed with a restore being made of the processor state at the point at which the interrupt occurred.

In accordance with the present technique, an execute block instruction is added which specifies an offset address (in this example a negative offset to the current program count value) to a block of program instructions to be fetched. The block has a length specified within the execute block instruction (e.g. up to 16 instructions as specified by a 4-bit field). The instruction decoder 14 has a block counter register 22 added to it to keep track of the number of instructions from the called block of instructions that have been executed so that when the end of that block has been reached the prefetch unit 16 can be commanded to restart fetching instructions from a memory location immediately following the execute block instruction within the initial program flow.

Figure 2:
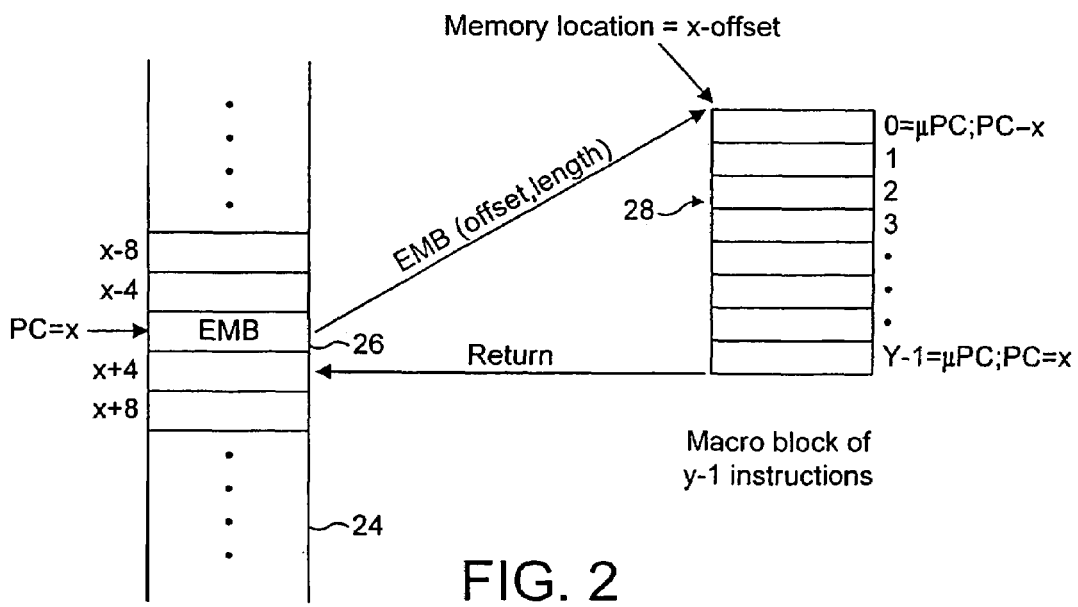
FIG. 2 schematically illustrates a call by an execute block instruction.

FIG. 2 illustrates an area of main program code 24 which is being sequentially executed. The program instructions are fetched in turn by the prefetch unit 16 to the instruction pipeline 12 where they are decoded and then executed. The program counter register 18 keeps a track of the address value corresponding to the program instruction currently being executed. In this example the program instructions are 32-bit instructions and accordingly the program counter value increments between instructions in steps of four bytes.

An execute block instruction (EMB: Execute Macroblock Instruction) 26 is located within the main code 24 at a PC value of "x". This execute block instruction includes within it as fields an offset value being a negative memory offset to a starting location of a reference block of program instructions 28 together with a length field specifying the number of program instructions (y–1) within the block of program instructions 28. The instruction decoder 14 is responsive to the execute block instruction 26 to start fetching program instructions, using the prefetch unit 16, from the new memory location pointed to by the offset field. These instructions are then executed. During execution of this block of program instructions the program counter value stored within the program counter register 18 is not incremented but is instead held at the value corresponding to the execute block instruction 26 itself, namely (x). The block counter register 22 is incremented by the instruction decoder starting from a value of zero up to a value of (y–1) corresponding to the end of the block of program instructions 28. When the instruction decoder 14 detects that the block counter value has reached a value of (y–1) which matches the length of the block as originally specified within the execute block instruction 26, the instruction decoder 14 then forces the return to the instruction immediately following the execute block instruction 26 by controlling the prefetch unit 16 to fetch that instruction (at location x+4) into the instruction pipeline 12.

As an alternative to the normal return behaviour, it is possible that a branch instruction may be embedded within the block of program instructions 28 directing a branch to an instruction at another memory location. If such a branch occurs, then it serves to clear the pending execute block instruction behaviour and processing proceeds starting from the target of the branch instruction in the normal way. It is also possible to have such a branch instruction as the last instruction within the block of program instructions 28 to trigger a return to a point in the main program code 24 other than the instruction immediately following the execute block instruction 26.

Figure 3:
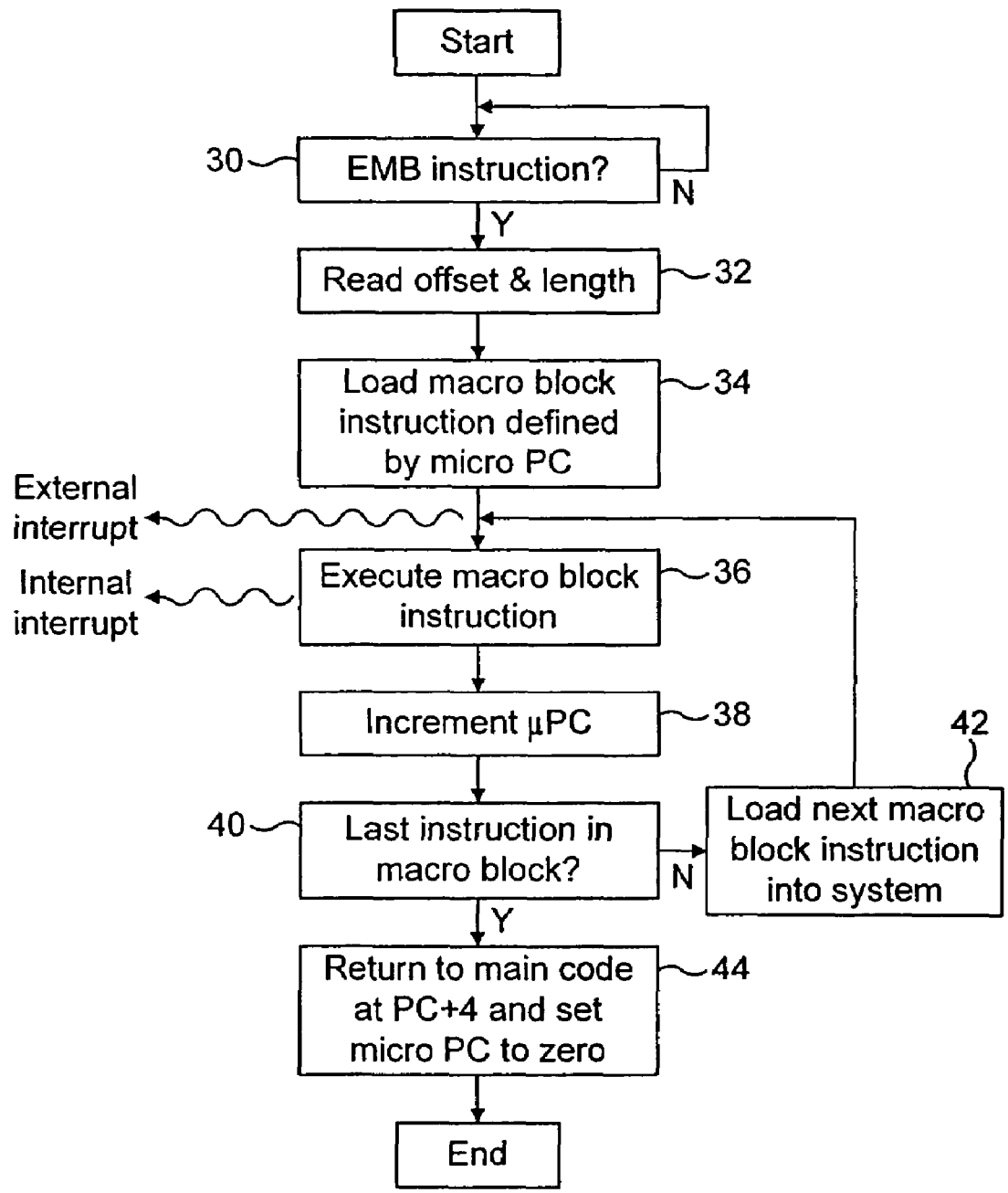
FIG. 3 is a flow diagram schematically illustrating the execution of a block of program instructions in a non-pipelined environment.

FIG. 3 is a flow diagram schematically illustrating the behaviour in a non-pipeline system (i.e. not the pipeline system of FIG. 1) of a data processing system responsive to an execute block instruction. At step 30 the instruction decoder detects whether an execute block instruction has been received. When such an execute block instruction has been received, processing proceeds to step 32 at which the address offset value and block length are read from the execute block instruction. At step 34 the first instruction from the block of program instructions pointed to by the current microPC (block counter register 22) is loaded into the system for decoding an execution starting from the memory location pointed to by the current program counter value minus the specified offset value. At step 36 the current program instruction from the block of program instructions is executed.

It will be appreciated that an external interrupt, as will be discussed later, can occur before the step 36 or an internal interrupt during the step 36. Whilst the occurrence of such external and internal interrupts is conventional, the way in which the return location after interrupt servicing is tracked is different when using the present technique and will be discussed in relation to FIG. 4.

After step 26, the block counter value is incremented at step 38 and then step 40 determines whether the last instruction within the block of program instructions has yet been reached. If the last instruction has not yet been reached, then processing proceeds to step 42 at which the next instruction is loaded into the system and a return is made to step 36. If the last instruction has been reached, then processing proceeds to step 44 at which a return is made to the main program code in which the execute block instruction occurred at a location immediately following that execute block instruction and the microPC value is set to zero.

Figure 4:
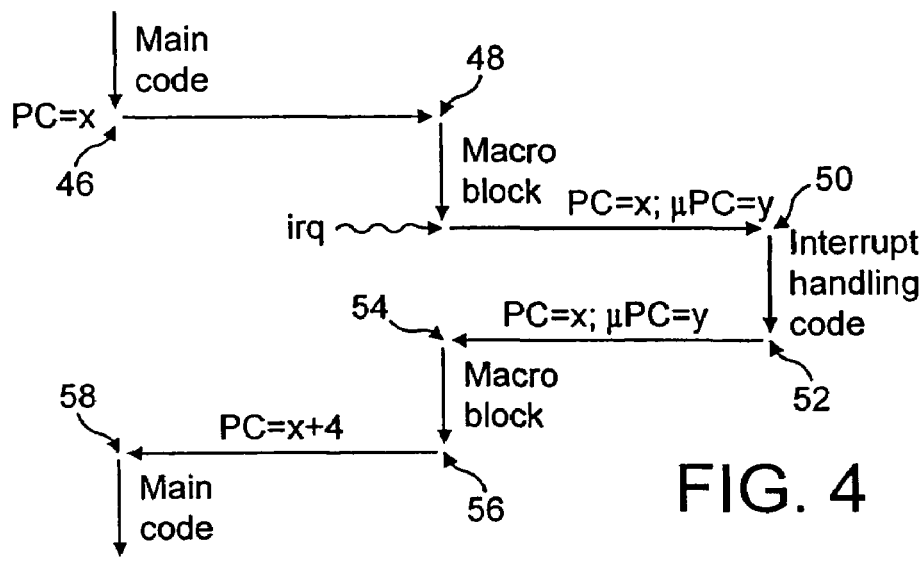
FIG. 4 schematically illustrates the interruption of a block of program instructions that has been called.

FIG. 4 schematically illustrates the occurrence of an interrupt during execution of a block of program instructions called by an execute block instruction. Firstly, an execute block instruction occurs at point 46 triggering the start of execution of the block of program instructions at point 48. During the execution of the block of program instructions, the program counter value is held at a value corresponding to the execute block instruction whilst the block counter value is incremented to indicate the position within the block of program instructions concerned. An interrupt occurs during the execution of the block of program instructions and this triggers the start of execution of interrupt handling code at step 50. The state of the data processing apparatus 2 is saved for later restarting by saving the program counter value and the block counter value, as well as other state variables in the normal way. When the interrupt handling code has finished, these saved program counter values and block counter values are restored. The program counter values can be saved in accordance with the normal exception handling mechanisms of processors such as the ARM processors designed by ARIN'I Limited of Cambridge, England. The block counter value can be saved in the context of such processors by using a bit field within the PSR register to be saved as a saved program status register configuration parameter. If the blocks of program instructions that may be called using an execute block instruction are restricted in length to a maximum size of 16 instructions, then the block counter value need only be four bits in length, which can be conveniently represented by a small bit field within the PSR register of an ARM processor.

Termination of the interrupt handling code at point 52 serves to trigger the restoring of the program counter value and the block counter value and resumption of the block of program instructions at point 54. After the block of program instructions has completed execution at point 56, a return is made to the main program code at point 58.

Figure 5:
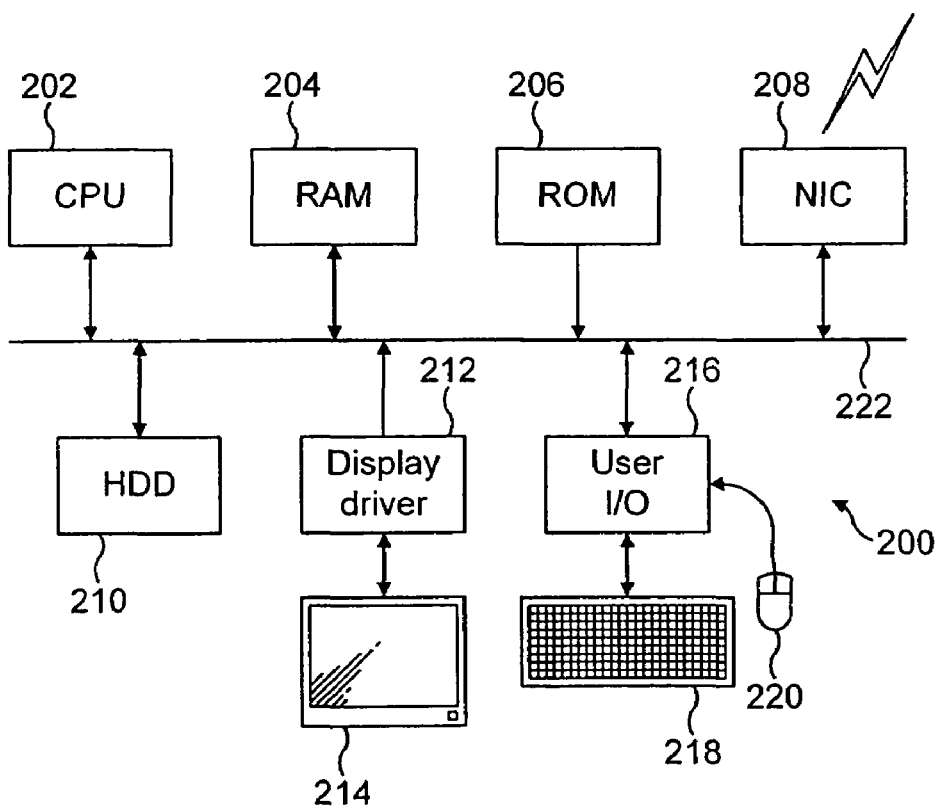
FIG. 5 schematically illustrates the architecture of a general purpose computer which may executed a computer program using the above techniques.

FIG. 5 schematically illustrates a general purpose computer 200 of the type that may be used to implement the above described techniques. The general purpose computer 200 includes a central processing unit 202, a random access memory 204, a read only memory 206, a network interface card 208, a hard disk drive 210, a display driver 212 and monitor 214 and a user input/output circuit 216 with a keyboard 218 and mouse 220 all connected via a common bus 222. In operation the central processing unit 202 will execute computer program instructions that may be stored in one or more of the random access memory 204, the read only memory 206 and the hard disk drive 210 or dynamically downloaded via the network interface card 208. The results of the processing performed may be displayed to a user via the display driver 212 and the monitor 214. User inputs for controlling the operation of the general purpose computer 200 may be received via the user input output circuit 216 from the keyboard 218 or the mouse 220. It will be appreciated that the computer program could be written in a variety of different computer languages. The computer program may be stored and distributed on a recording medium or dynamically downloaded to the general purpose computer 200. When operating under control of an appropriate computer program, the general purpose computer 200 can perform the above described techniques and can be considered to form an apparatus for performing the above described technique. The architecture of the general purpose computer 200 could vary considerably and FIG. 5 is only one example.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

I claim:

1. Apparatus for processing data, said apparatus comprising:
    an instruction fetching circuit operable to fetch program instructions from a sequence of memory locations;
    an instruction decoder responsive to program instructions fetched by said instruction fetching circuit to control data processing operations specified by said program instructions; and
    an execution circuit operable under control of said instruction decoder to execute said data processing operations;
    a program counter register operable when said apparatus is executing said program instructions from said sequence of memory locations to store an address indicative of a memory location of a program instruction being executed within said program instructions from said sequence of memory locations; and
    a block counter register operable to store a block count value indicative of a location of a program instruction being executed within a block of two or more program instructions, specified by a location field within said execute block instruction; and
    wherein said instruction decoder is responsive to an execute block instruction to trigger fetching of a block of two or more program instructions by said instruction fetching circuit and execution of said block of two or more program instructions by said execution circuit, said block of two or more instructions containing a number of program instructions specified by a block length field within said executed block instruction and being stored at a memory location instruction; and
    wherein when executing said block of two or more program instructions, said program counter register is configured to store an address indicative of a memory location where said execute block instruction is stored and said block counter register is configured to store a block count value indicative of said program instruction location of a program instruction being executed within said block of two or more program instructions corresponding to said execute block instruction,
    the apparatus further comprising:
    an exception handling circuit operable upon occurrence of an exception during execution of said block of two or more instructions to store said block count value, and upon completion of handling of said exception, to restart execution of said block of two or more program instructions at a program instruction within said block of two or more instructions indicated by said block count value.

2. Apparatus as claimed in claim 1, wherein after execution of said block of two or more program instructions a return is made to a program instruction outside of said block of two or more program instructions.

3. Apparatus as claimed in claim 1, wherein said return is to a program instruction immediately following said execute block instruction within said sequence of memory locations.

4. Apparatus as claimed in claim 1, wherein said location field is an offset field specifying said location of said block of two or more program instructions relative to a memory location of said execute block instruction.

5. Apparatus as claimed in claim 1, wherein said exception handling circuit is operable to store an address indicative of a memory location where said execute block instruction is stored upon occurrence of said exception and to restore said address indicative of a memory location where said execute block instruction is stored to said program counter register upon said completion of handling of said exception.

6. Apparatus as claimed in claim 2, wherein upon completion of execution of said block of two or more program instructions said instruction decoder is operable to return processing to a program instruction following said execute block instruction as indicated by said program counter register.

7. A method for processing data, said method comprising the steps of:
    fetching program instructions from a sequence of memory locations with an instruction fetching circuit;
    controlling data processing operations specified by said program instructions with an instruction decoder; and
    executing said data processing operations with an execution circuit controlled by said instruction decoder;
    storing within a program counter register an address indicative of a memory location of a program instruction being executed within said sequence of program instructions; and
    storing within a block counter register a block count value indicative of a location of a program instruction being executed within a block of two or more program instructions,
    wherein said instruction decoder is responsive to an execute block instruction to trigger fetching of a block of two or more program instructions by said instruction fetching circuit and execution of said block of two or more program instructions by said execution circuit, said block of two or more instructions containing a number of program instructions specified by a block length field within said executed block instruction and being stored at a memory location specified by a location field within said execute block instruction, wherein when executing said block of two or more program instructions, said program counter register stores an address indicative of a memory location where said execute block instruction is stored and said block counter register stores a block count value indicative of said program instruction location of a program instruction being executed within said block of two or more program instructions corresponding to said execute block instruction; and upon occurrence of an exception during execution of said block of two or more instructions storing said block count value and upon completion of handling of said exception, restarting execution of said block of two or more program instructions at a program instruction within said block of two or more instructions indicated by said block count value.

8. A method as claimed in claim 7, wherein after execution of said block of two or more program instructions a return is made to a program instruction outside of said block of two or more program instructions.

9. A method as claimed in claim 7, wherein said return is to a program instruction immediately following said execute block instruction within said sequence of memory locations.

10. A method as claimed in claim 7, wherein said location field is an offset field specifying said location of said block of two or more program instructions relative to a memory location of said execute block instruction.

11. A method as claimed in claim 7, wherein upon occurrence of said exception storing an address indicative of a memory location where said execute block instruction is stored and restoring said address indicative of a memory location where said execute block instruction is stored to said program counter register upon said completion of handling of said exception.

12. A method as claimed in claim 8, wherein upon completion of execution of said block of two or more program instructions said instruction decoder is operable to return processing to a program instruction following said execute block instruction as indicated by said program counter register.

13. A computer program product stored on a computer-readable storage medium including a computer program operable to control a data processing apparatus having an instruction fetching circuit operable to fetch program instructions from a sequence of memory locations, an instruction decoder responsive to program instructions fetched by said instruction fetching circuit to control data processing operations specified by said program instructions, and an execution circuit operable under control of said instruction decoder to execute said data processing operations and to store within a program counter register an address indicative of a memory location of a program instruction being executed within said sequence of program instructions;

wherein said computer program including one or more an execute block instructions is operable to trigger fetching of a block of two or more program instructions by said instruction fetching circuit and execution of said block of two or more program instructions by said execution circuit and storing within a block counter register a block count value indicative of a location of a program instruction being executed within said block of two or more program instructions, said block of two or more instructions containing a number of program instructions specified by a block length field within said executed block instruction and being stored at a memory location specified by a location field within said execute block instruction, and wherein said one or more execute block instructions is operable to cause, during execution of said block of two or more program instructions, said program counter register to store an address indicative of a memory location where said execute block instruction is stored and to cause said block counter register to store a block count value indicative of said program instruction location of a program instruction being executed within said block of two or more program instructions corresponding to said execute block instruction; and exception handling code, operable upon occurrence of an exception during execution of said block of two or more instructions, to store said block count value such that upon completion of handling of said exception, execution of said block of two or more program instructions at a program instruction within said block of two or more instructions indicated by said block count value.

14. A computer program product as claimed in claim 13, wherein after execution of said block of two or more program instructions a return is made to a program instruction outside of said block of two or more program instructions.

15. A computer program product as claimed in claim 13, wherein said return is to a program instruction immediately following said execute block instruction within said sequence of memory locations.

16. A computer program product as claimed in claim 13, wherein said location field is an offset field specifying said location of said block of two or more program instructions relative to a memory location of said execute block instruction.

17. A computer program product as claimed in claim 13, wherein upon occurrence of said exception storing an address indicative of a memory location where said execute block instruction is stored and restoring said address indicative of a memory location where said execute block instruction is stored to said program counter register upon said completion of handling of said exception.

18. A computer program product as claimed in claim 14, wherein upon completion of execution of said block of two or more program instructions said instruction decoder is operable to return processing to a program instruction following said execute block instruction as indicated by said program counter register.

* * * * *